(12) United States Patent
Fukinuki et al.

(10) Patent No.: US 6,246,651 B1
(45) Date of Patent: Jun. 12, 2001

(54) DISK APPARATUS IN WHICH AN IMPROVED CURRENT SUPPLY CONTROL IS PERFORMED TO EFFECTIVELY REDUCE A CURRENT CONSUMPTION

(75) Inventors: Shigeru Fukinuki, Kokubunji; Junichi Kanenaga, Tanashi, both of (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/187,882

(22) Filed: Nov. 6, 1998

(30) Foreign Application Priority Data

Nov. 7, 1997 (JP) .................................................. 9-305949

(51) Int. Cl.[7] .................................................. G11B 20/10
(52) U.S. Cl. .................. 369/53.3; 369/53.37; 369/47.39
(58) Field of Search .................................. 369/47, 50, 54, 369/58, 44.28, 44.27, 44.29, 47.38, 47.39, 47.4, 47.45, 47.46, 47.55, 53.3, 53.43, 53.45, 53.37, 124.02; 360/73.03

(56) References Cited

FOREIGN PATENT DOCUMENTS 1-166358    6/1989    (JP) .

Primary Examiner—Paul W. Huber
(74) Attorney, Agent, or Firm—Anderson, Kill & Olick P.C.

(57) ABSTRACT

A disk apparatus in which a control unit performs a seek control includes a disk motor which rotates a disk placed at a loaded position in the disk apparatus. A motor driver controls the disk motor such that the disk is rotated by the disk motor at a controlled speed. A read/write head reads information from or writes information to the disk when the disk is rotated by the disk motor at the controlled speed. A head shifting unit shifts the head in a radial direction of the disk to a target location thereof when a seek is performed. A current supply control unit controls current supplied to the disk motor during the seek. In the disk apparatus, the current supply control unit cuts off the current supply to the disk motor for a predetermined period after a start of the seek.

9 Claims, 12 Drawing Sheets

US 6,246,651 B1

DISK APPARATUS IN WHICH AN IMPROVED CURRENT SUPPLY CONTROL IS PERFORMED TO EFFECTIVELY REDUCE A CURRENT CONSUMPTION

BACKGROUND OF THE INVENTION (1) Field of the Invention

The present invention generally relates to a disk apparatus, and more particularly to a disk apparatus in which a control unit performs a seek control to shift a read/write head to a target location of a disk before reading data from or writing data to the disk.

(2) Description of the Related Art

As disclosed in Japanese Laid-Open Patent Application No. 1-166358, there is known a disk apparatus which performs a seek to shift a head to a target location of a disk before reading data from or writing data to the disk. In order to reduce a power consumption, in the conventional disk apparatus of the above publication, the supplying of current to a disk motor is inhibited when the head is shifted in a radial direction of the disk during the seek, and the supplying of current to the disk motor is restarted at the end of the seek. However, in the conventional disk apparatus, the current supply to the disk motor is inhibited throughout the period from the seek start to the seek end. The rotation speed of the disk is significantly reduced as a result of the cut of the current supply. The conventional disk apparatus requires a certain time to raise the rotation speed of the disk from the reduced level to the original level after the restart of the current supply. It is difficult for the conventional disk apparatus to provide a stable read/write operation of the head because it takes too much time to raise the rotation speed of the disk to the original level from the reduced level after the supplying of current to the disk motor is inhibited throughout the period of the seek.

SUMMARY OF THE INVENTION

An object of the present invention is to provide an improved disk apparatus in which the above-described problems are eliminated.

Another object of the present invention is to provide a disk apparatus having an improved current supply control unit to effectively reduce a current consumption of the disk apparatus during a seek while providing a stable read/write operation of a read/write head.

The above-mentioned objects of the present invention are achieved by a disk apparatus in which a control unit performs a seek control, comprising: a disk motor which rotates a disk placed at a loaded position in the disk apparatus; a motor driver which controls the disk motor such that the disk is rotated by the disk motor at a controlled speed; a read/write head which reads information from or writes information to the disk when the disk is rotated by the disk motor at the controlled speed; a head shifting unit which shifts the head in a radial direction of the disk to a target location thereof when a seek is performed; and a current supply control unit which controls current supplied to the disk motor during the seek, wherein the current supply control unit cuts off the current supply to the disk motor for a predetermined period after a start of the seek.

In the disk apparatus of the present invention, at a time of occurrence of a peak in a current consumption of the head shifting unit during the seek, the current supply to the disk motor is cut off by the current supply control unit, and a corresponding amount of current is not supplied to the disk motor. It is possible to effectively reduce the total current consumption of the disk apparatus during the seek. It is possible to effectively reduce the fluctuation of the total current consumption of the disk apparatus at the peak of the current consumption of the head shifting unit or a tracking actuator. Hence, it is possible for the disk apparatus of the present invention to effectively reduce the total current consumption during the seek while providing a stable read/write operation of the read/write head.

BRIEF DESCRIPTION OF THE DRAWINGS

Other objects, features and advantages of the present invention will be more apparent from the following detailed description when read in conjunction with the accompanying drawings in which.

DETAILED DESCRIPTION OF THE PREFERRED EMBODIMENTS

Before giving a description of the preferred embodiments of the present invention, a description will now be given of an existing disk apparatus with reference to the accompanying drawings, for the purpose of explaining a construction of a disk apparatus which performs a seek to shift a read/write head to a target location of a disk before accessing the disk.

Figure 9:
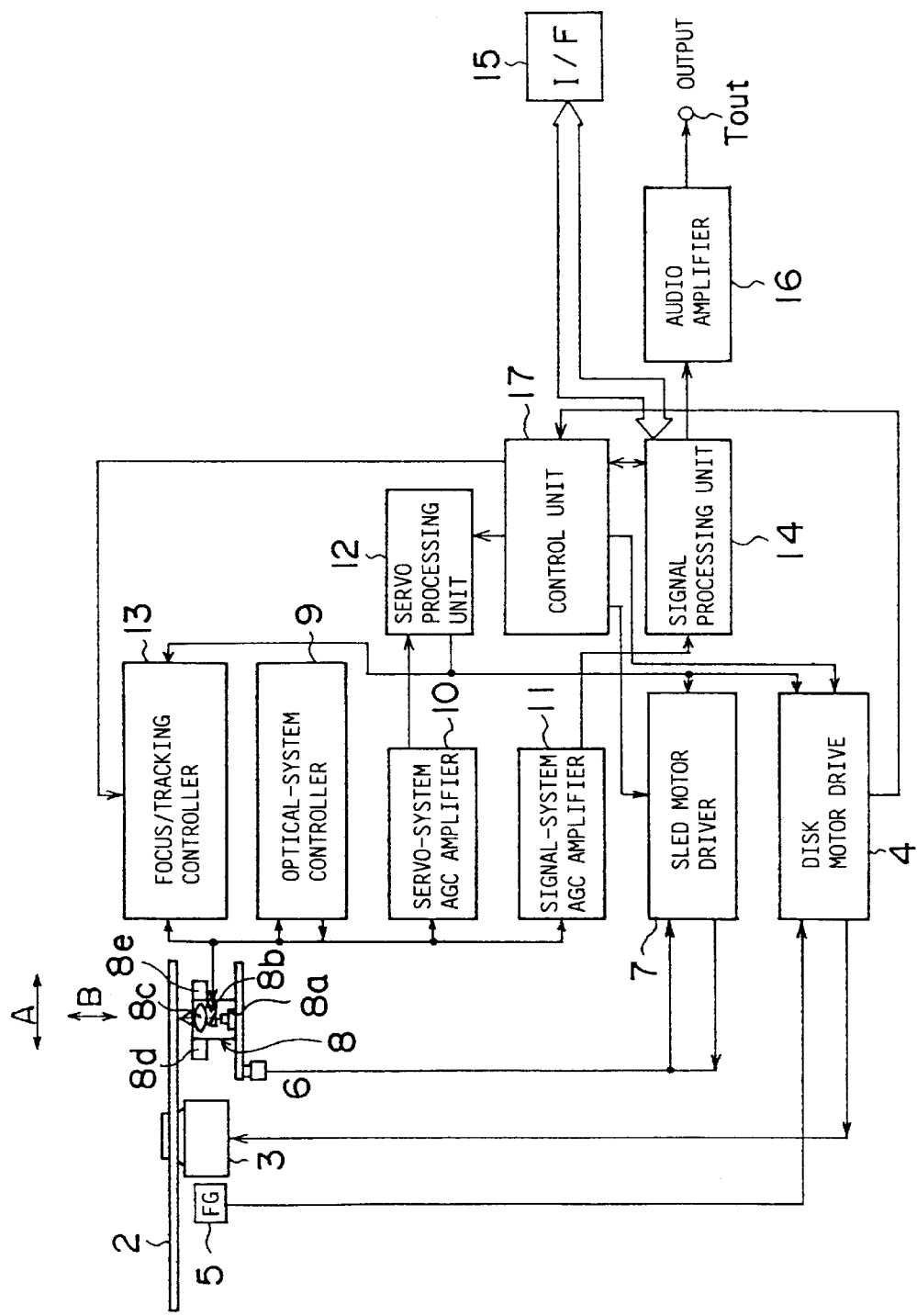
FIG. 9 is a block diagram of an existing disk apparatus.

FIG. 9 shows an existing disk apparatus 1. The disk apparatus of FIG. 9 constitutes an optical disk apparatus which plays back an optical disk, such as a CD (compact disk) or a CD-ROM (compact disk read-only memory).

The disk apparatus 1 of FIG. 9 optically reads data from an optical disk 2 during the rotation of the disk 2 by using an optical head 8. The disk 2 is inserted into the disk apparatus 1, and the disk 2 is placed at a loaded position within the apparatus 1 by a loading mechanism (not shown in FIG. 9).

When the disk 2 is placed at the loaded position within the apparatus 1, the disk 2 is fitted to a rotary hub of a disk motor 3, and the disk 2 is rotated by the disk motor 3. The disk motor 3 is called also a spindle motor. A frequency generator (FG) 5 which detects a rotation speed of the disk motor 3 is connected to the disk motor driver 4. The frequency generator 5 outputs a signal, indicative of the rotation speed of the disk motor 3, to the disk motor driver 4. The disk motor 3 is controlled by the disk motor driver 4 based on the signal output by the frequency generator 5, such that a linear velocity of the rotating disk 2 is maintained at a constant level. Hereinafter, this control of the disk motor 3 will be called a normal control.

Alternatively, the disk motor driver 4 may control the disk motor 3 based on the signal output by the frequency generator 5, such that an angular velocity of the rotating disk 2 is maintained at a constant level.

In the disk apparatus 1, a sled motor 6 is provided. The sled motor 6 is controlled by a sled motor driver 7. The optical head 8 is shifted in a radial direction of the disk 2 by the sled motor 6 under the control through the sled motor driver 7.

Further, in the disk apparatus 1, an optical head 8 is provided. The optical head 8 is called also an optical pickup. The optical head 8 includes a laser diode 8a which emits a laser beam. A photodetector 8b receives a reflection beam from the disk 2 and outputs a detection signal indicative of information recorded in the disk 2. An objective lens 8c converts the laser beam into a converging laser beam onto the disk 2. A tracking actuator 8d shifts the objective lens 8c in one of the disk radial directions indicated by the arrows "A" in FIG. 9. A focusing actuator 8e shifts the objective lens 8c in one of the optical axis directions indicated by the arrows "B" in FIG. 9.

In the optical head 8, the laser beam emitted by the laser diode 8a is converted into a converging laser beam by the objective lens 8c, so that the converging laser beam from the objective lens 8c hits the disk 2. A reflection beam from the disk 2 is received by the photodetector 8b, and the photodetector 8b outputs a detection signal indicative of information recorded in the disk 2. The optical head 8 supplies the detection signal output by the photodetector 8b, to each of an optical-system controller 9, a servo-system AGC (automatic gain control) amplifier 10 and a signal-system AGC amplifier 11.

The optical-system controller 9 controls an intensity of the laser beam, emitted by the laser diode 8a, in response to the reflection beam from the disk 2, so as to produce an optimum emission beam intensity. The servo-system AGC amplifier 10 takes servo data from the detection signal supplied by the optical head 8, and amplifies the servo data through the automatic gain control. The servo-system AGC amplifier 10 supplies the amplified signal to a servo processing unit 12.

The servo processing unit 12 generates various control data from the servo data supplied by the servo-system AGC amplifier 10, and controls the optical head 8 so as to read data from the disk 2 in an optimum reading condition. The servo processing unit 12 supplies the control data to the disk motor driver 4, the sled motor driver 7 and a focus/tracking controller 13, respectively.

The focus/tracking controller 13 controls both the tracking actuator 8d and the focusing actuator 8e of the optical head 8 based on the control data supplied by the servo processing unit 12. The signal-system AGC amplifier 11 takes a primary data signal from the detection signal supplied by the photodetector 8b, and amplifies the primary data signal through the automatic gain control. The signal-system AGC amplifier 11 supplies the amplified signal to a signal processing unit 14.

The signal processing unit 14 performs a frequency demodulation and error correction processing of the primary data signal and outputs a reproduced signal to an interface unit 15. The interface unit 15 provides an interface between the apparatus 1 and an external system. An audio signal derived from the reproduced signal is supplied to an audio amplifier 16. The audio amplifier 16 outputs the amplified audio signal from an output terminal "Tout".

In the disk apparatus 1 of FIG. 9, the disk motor driver 4, the sled motor driver 7, the optical-system controller 9, the servo-system AGC amplifier 10, the signal-system AGC amplifier 11, the focus/tracking controller 13, and the signal processing unit 14 are controlled by a control unit 17.

Next, a description will be given of a seek control procedure performed by the disk apparatus 1.

The seek control procedure is executed by the control unit 17 in order to control a drive current supplied to the elements of the disk apparatus 1, including the disk motor 3, the sled motor 6 and the tracking actuator 8d, during the seek.

A seek pattern during the seek of the disk apparatus 1 is divided into a macro seek pattern, a micro seek pattern and a one-track seek pattern. Control patterns of the control unit 17 for these seek patterns are slightly different from one another.

When a seek command is issued, the control unit 17 calculates a shifting distance of the optical head 8 based on the seek command. The control unit 17 selects one of the three seek patterns based on the calculated shifting distance, and performs a corresponding seek in accordance with the selected seek pattern.

Figure 10:
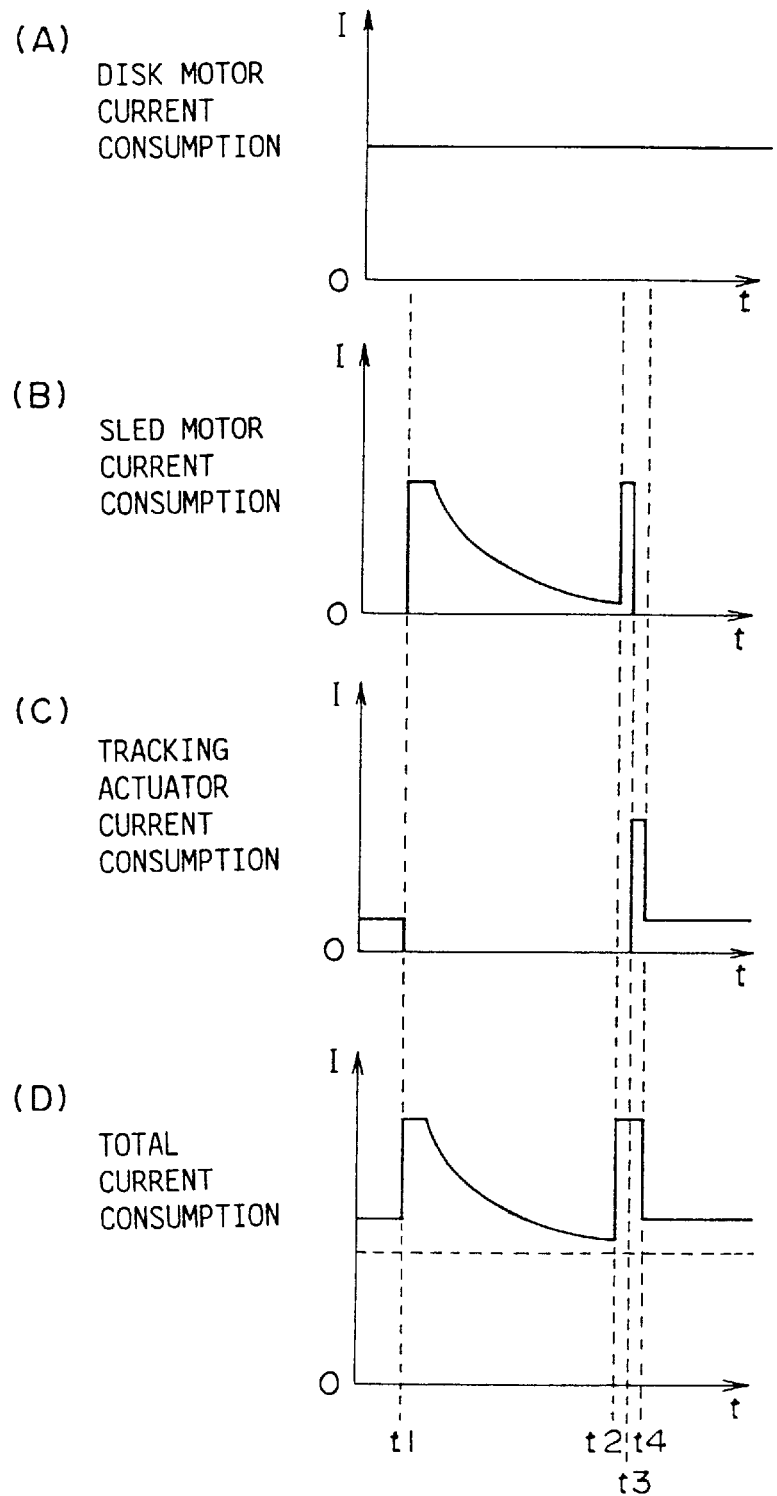
FIG. 10 is a time chart for explaining changes of current consumed by the elements of the disk apparatus of FIG. 9 when a macro seek is performed.

FIG. 10 is a time chart for explaining changes of current consumed by the elements of the disk apparatus 1 when the macro seek is performed. A macro seek control procedure is executed by the control unit 17 in accordance with the macro seek pattern.

In FIG. 10, (A) indicates a current consumption of the disk motor 3 during the macro seek, (B) indicates a current consumption of the sled motor 6 during the macro seek, (C) indicates a current consumption of the tracking actuator 8d during the macro seek, and (D) indicates a total current consumption of the elements 3, 6 and 8d of the disk apparatus 1 during the macro seek.

As shown in FIG. 10, the control unit 17 at a time "t1" selects the macro seek pattern based on the calculated shifting distance, and starts performing the macro seek in accordance with the selected macro seek pattern. The current consumption of the disk motor 3 is maintained at a constant level during the macro seek as indicated by (A) in FIG. 10. The current supplied to the tracking actuator 8d is cut off at the time "t1" as indicated by (C) in FIG. 10. The current consumption of the sled motor 6 shows its peak at the time "t1" as indicated by (B) in FIG. 10.

The current consumption of the sled motor 6 is gradually reduced until a time "t2" elapses, and the shifting speed of the optical head 8 by the sled motor 6 is decreased. The optical head 8 is shifted to a position near the target location of the disk 2. A braking force is exerted on the sled motor 6 to stop the shifting of the optical head 8, and the current consumption of the sled motor 6 shows its peak again at the time "t2" as indicated by (B) in FIG. 10.

The current supplied to the sled motor 6 is cut off at a time "t3". As indicated by (C) in FIG. 10, the current supplied to the tracking actuator 8d is turned ON at the time "t3", and the tracking servo control is started by the control unit 17. The current consumption of the tracking actuator 8d shows its peak at the time "t3". At a time "t4", the tracking servo control becomes stable, and the current consumption of the tracking actuator 8d is reduced as indicated by (C) in FIG. 10.

As indicated by (D) in FIG. 10, the total current consumption of the elements 3, 6 and 8d of the disk apparatus 1 during the macro seek is produced by a sum of the respective current consumptions (indicated by (A), (B) and (C) in FIG. 10) of the disk motor 3, the sled motor 6 and the tracking actuator 8d.

Figure 11:
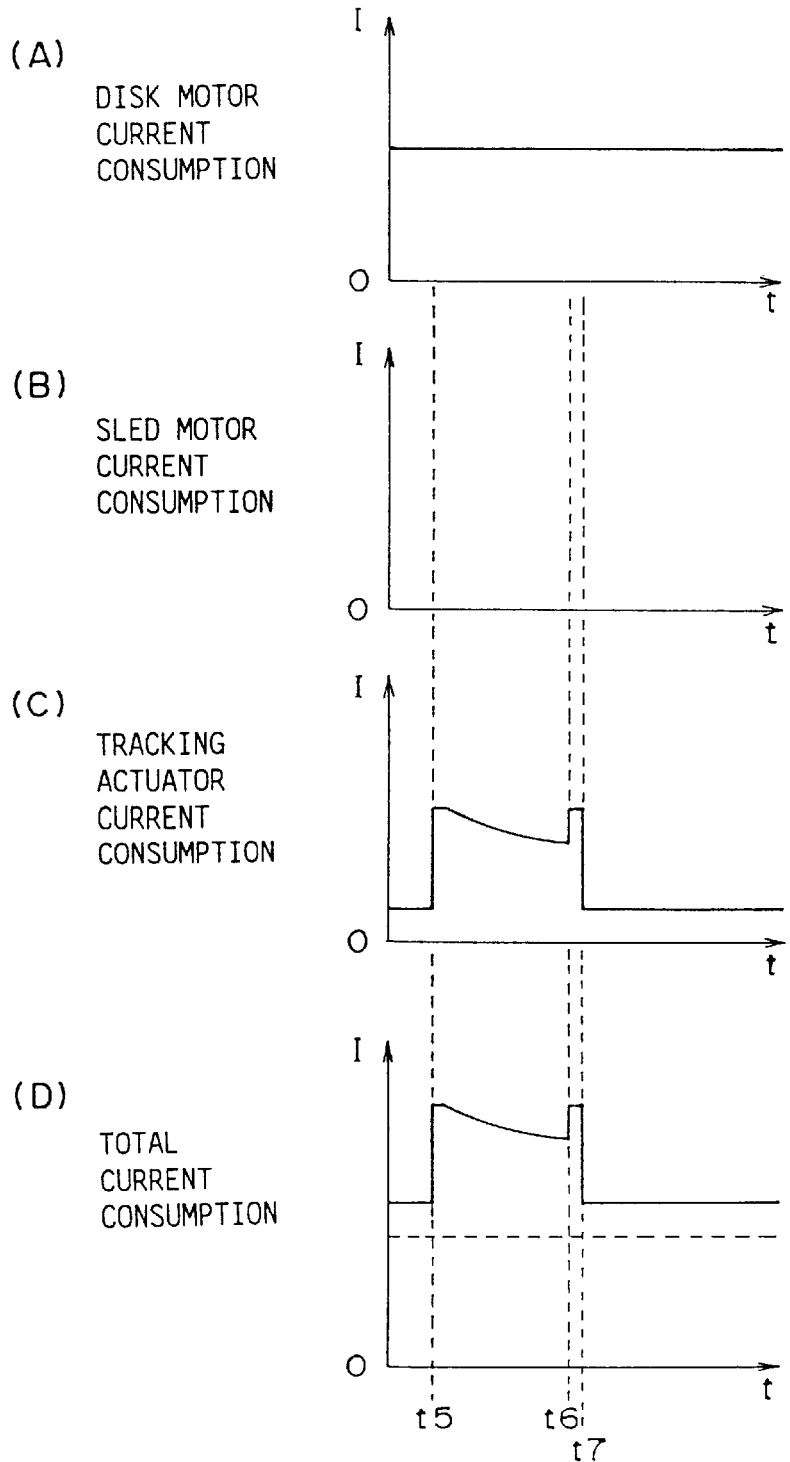
FIG. 11 is a time chart for explaining changes of current consumed by the elements of the disk apparatus of FIG. 9 when a micro seek is performed.

FIG. 11 is a time chart for explaining changes of current consumed by the elements of the disk apparatus 1 when the micro seek is performed. A micro seek control procedure is executed by the control unit 17 in accordance with the micro seek pattern.

In FIG. 11, (A) indicates a current consumption of the disk motor 3 during the micro seek, (B) indicates a current consumption of the sled motor 6 during the micro seek, (C) indicates a current consumption of the tracking actuator 8d during the micro seek, and (D) indicates a total current consumption of the elements 3, 6 and 8d of the disk apparatus 1 during the micro seek.

As shown in FIG. 11, during the micro seek, the current consumption of the disk motor 3 is maintained at a constant level. When a calculated shifting distance is below an effective shifting distance of the objective lens 8c by the tracking actuator 8d, the control unit 17 selects the micro seek pattern based on the calculated shifting distance, and starts performing the micro seek in accordance with the selected micro seek pattern. The current supplied to the sled motor 6 is cut off during the micro seek as indicated by (B) in FIG. 11.

At a time "t5", a micro seek command is issued. A drive current is supplied to the tracking actuator 8d at the time "t5" as indicated by (C) in FIG. 11. The current consumption of the tracking actuator 8d shows its peak at the time "t5". After the drive current supplied to the tracking actuator 8d is allowed, the shifting of the objective lens 8c in a radial direction of the disk 2 (or in one of the directions "A" in FIG. 9) is started by the tracking actuator 8d.

The current consumption of the tracking actuator 8d is gradually reduced until a time "t6" elapses, and the shifting speed of the objective lens 8c by the tracking actuator 8d is decreased. The objective lens 8c is shifted to a position near the target location of the disk 2. When it is detected that the actual shifting amount of the objective lens 8c matches with the calculated shifting distance, a braking force is exerted at the time "t6" on the tracking actuator 8d to stop the shifting of the objective lens 8c. The current consumption of the tracking actuator 8d shows its peak again at the time "t6" as indicated by (C) in FIG. 11. The tracking servo control becomes stable after the braking force is exerted, and the current consumption of the tracking actuator 8d is reduced at a time "t7" as indicated by (C) in FIG. 11. Thereafter, the reading of data from the disk 2 is started by the optical head 8.

As indicated by (D) in FIG. 11, the total current consumption of the elements 3, 6 and 8d of the disk apparatus 1 during the micro seek is produced by a sum of the respective current consumptions (indicated by (A), (B) and (C) in FIG. 11) of the disk motor 3, the sled motor 6 and the tracking actuator 8d.

A control pattern of the control unit 17 during the one-track seek is in conformity with that of the control unit 17 during the above-described micro seek. A shifting distance of the optical head 8 during the one-track seek is equivalent to one track of the disk 2, and it is extremely short. The control of the control unit 17 during the one-track seek is equivalent to the supplying of a one-shot pulse of the drive current to the tracking actuator 8d. In other words, during the one-track seek, the control unit 17 supplies a given amount of current to the tracking actuator 8d in a manner similar to the drive current supplied to the tracking actuator 8d between the time "t6" and the time "t7", indicated by (C) in FIG. 11, during the micro seek.

Practically, the seek control procedures are sequentially performed by the disk apparatus 1 such that the optical head 8 is roughly shifted by the sled motor 6 to a position near the target location of the disk 2 during the macro seek, and the position of the objective lens 8c is finely adjusted by the tracking actuator 8d during the micro seek, and the objective lens 8c is finally locked to the target location of the disk 2 by the tracking actuator 8d during the one-track seek.

Figure 12:
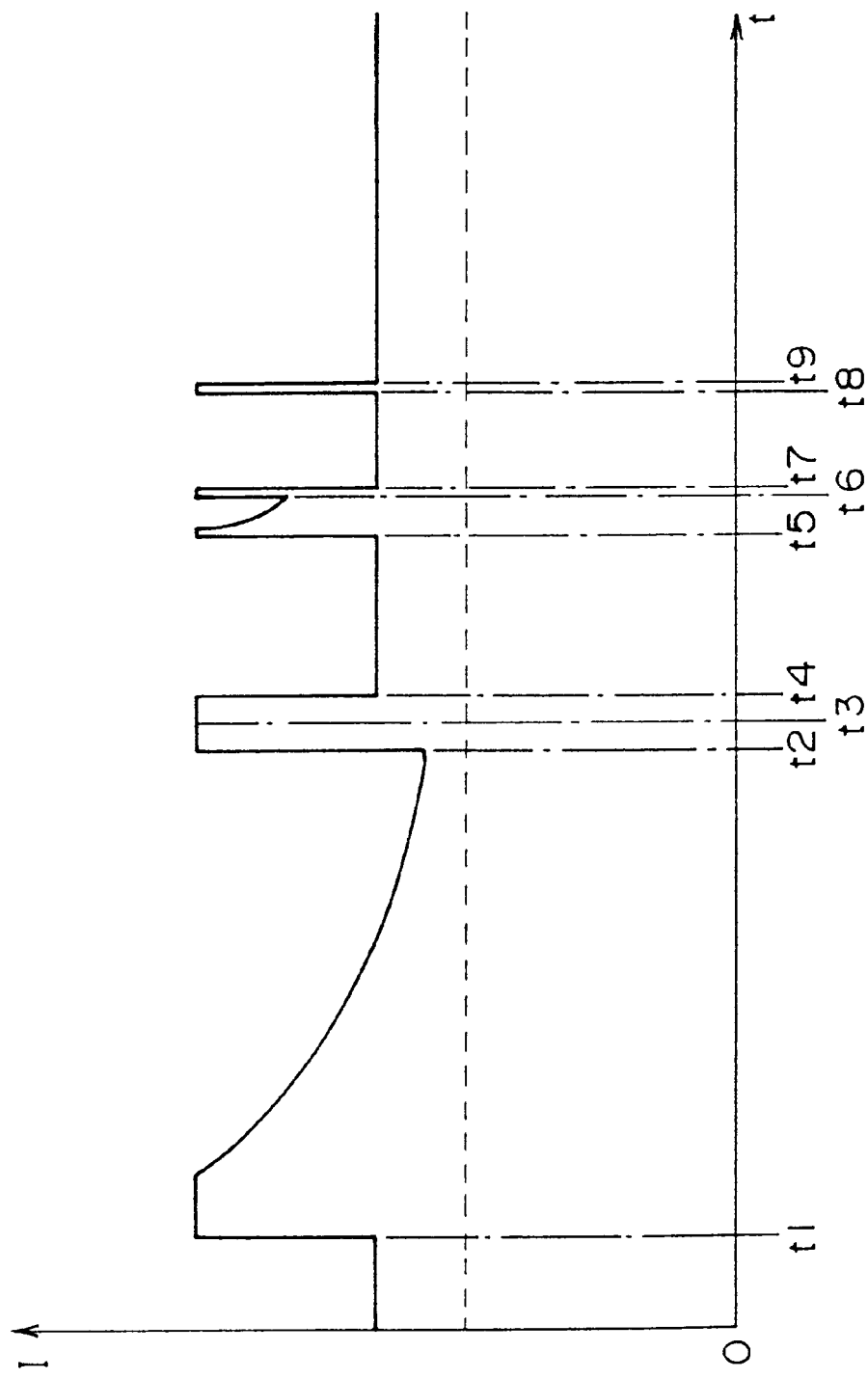
FIG. 12 is a time chart for explaining changes of current consumed by the disk apparatus of FIG. 9.

FIG. 12 is a time chart for explaining changes of current consumed by the disk apparatus 1 during the seek. In FIG. 12, the macro seek is performed for a duration between the time "t1" and the time "t4", the micro seek is performed for a duration between the time "t5" and the time "t7", and the one-track seek is performed for a duration between a time "t8" and a time "t9".

In the above-described disk apparatus 1, the current supplied to the disk motor 3 throughout the seek is maintained at a constant level. This raises a substantial current consumption of the disk motor 3 during the seek, which makes it difficult to reduce the power consumption of the disk apparatus 1 during the seek.

As shown in FIG. 10, the current consumption of the sled motor 6 indicates its peak at the time "t1" when the shifting of the optical head 8 by the sled motor 6 is started, and at the time "t2" when the braking force is exerted. Also, as shown in FIG. 10, the current consumption of the tracking actuator 8d indicates its peak at the time "t3" when the tracking servo control is started. Further, as shown in FIG. 11, the current consumption of the tracking actuator 8d indicates its peak at the time "t5" when the shifting of the objective lens 8c by the tracking actuator 8d is started, and at the time "t6" when the braking force is exerted to stop the shifting of the objective lens 8c. Hence, the total current consumption of the disk apparatus 1 indicates, as shown in FIG. 12, the sharply rising edges at the times "t1", "t2", "t5", "t6" and "t8" respectively.

A description will now be given of the preferred embodiments of the present invention with reference to the accompanying drawings.

Figure 1:
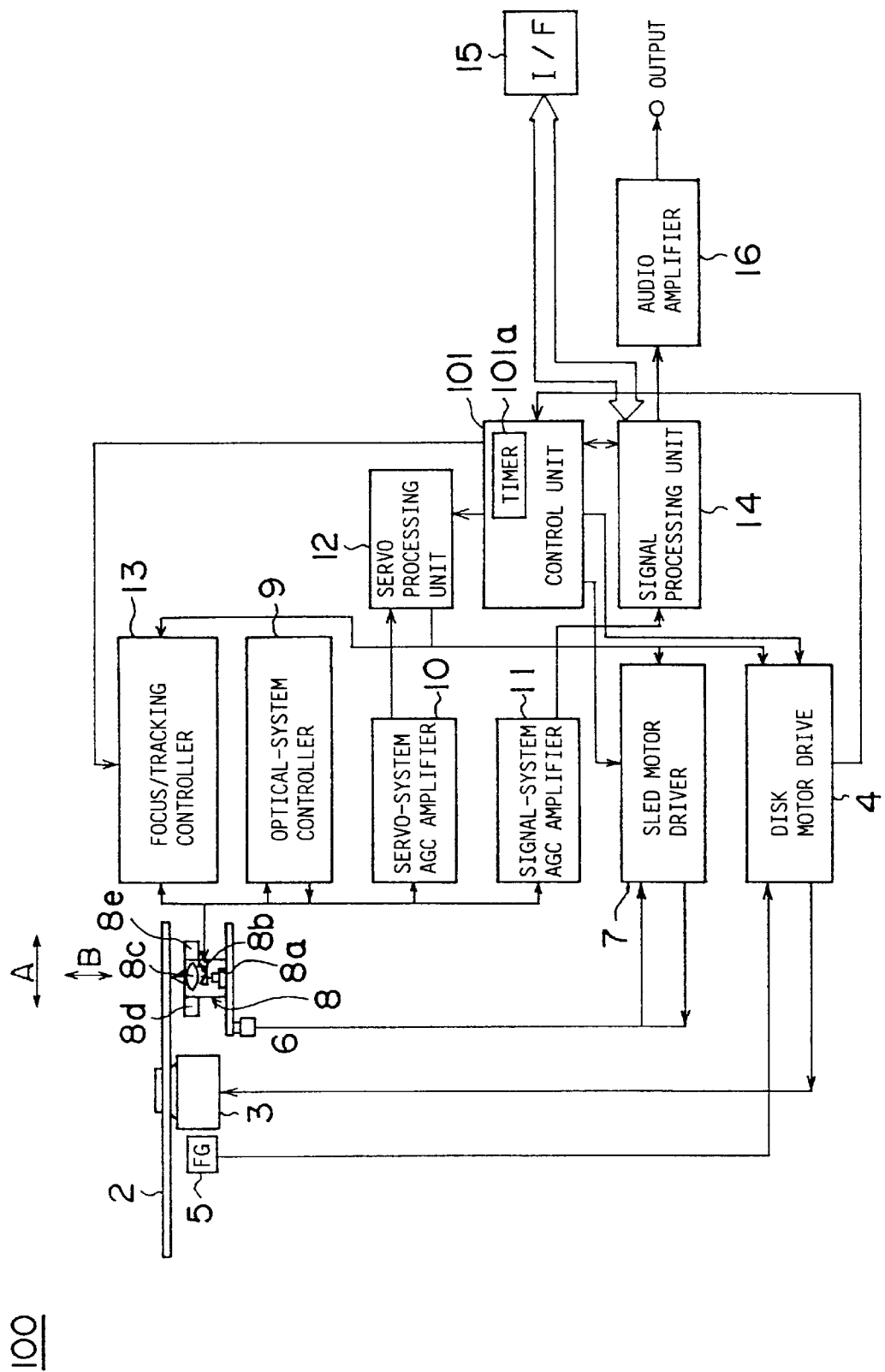
FIG. 1 is a block diagram of one embodiment of a disk apparatus of the present invention.

FIG. 1 shows one embodiment of the disk apparatus of the present invention. In FIG. 1, the elements which are the same as corresponding elements in FIG. 9 are designated by the same reference numerals, and a description thereof will be omitted.

As shown in FIG. 1, a disk apparatus 100 includes a control unit 101. The control unit 101 includes a motor off timer 101a which will be described below. In the present embodiment, the control unit 101 executes seek control procedures so as to cut off the current supplied to the disk motor 3 at the time of occurrence of the peak in the current consumption of the sled motor 6, and at the time of occurrence of the peak in the current consumption of the tracking actuator 8d, which will be described below.

The seek control procedures executed by the control unit 101 are different from the seek control procedures executed by the previously-described disk apparatus 1 of FIG. 9. The control unit 101, when executing the seek control procedures, acts as an improved current supply control unit which effectively reduces a total current consumption of the disk apparatus 100 during the seek while providing a stable read/write operation of the optical head 8.

In the present embodiment, a seek pattern during the seek of the disk apparatus 100 is divided into a macro seek pattern, a micro seek pattern and a one-track seek pattern. Control patterns of the control unit 101 for these seek patterns are slightly different from one another.

Figure 2:
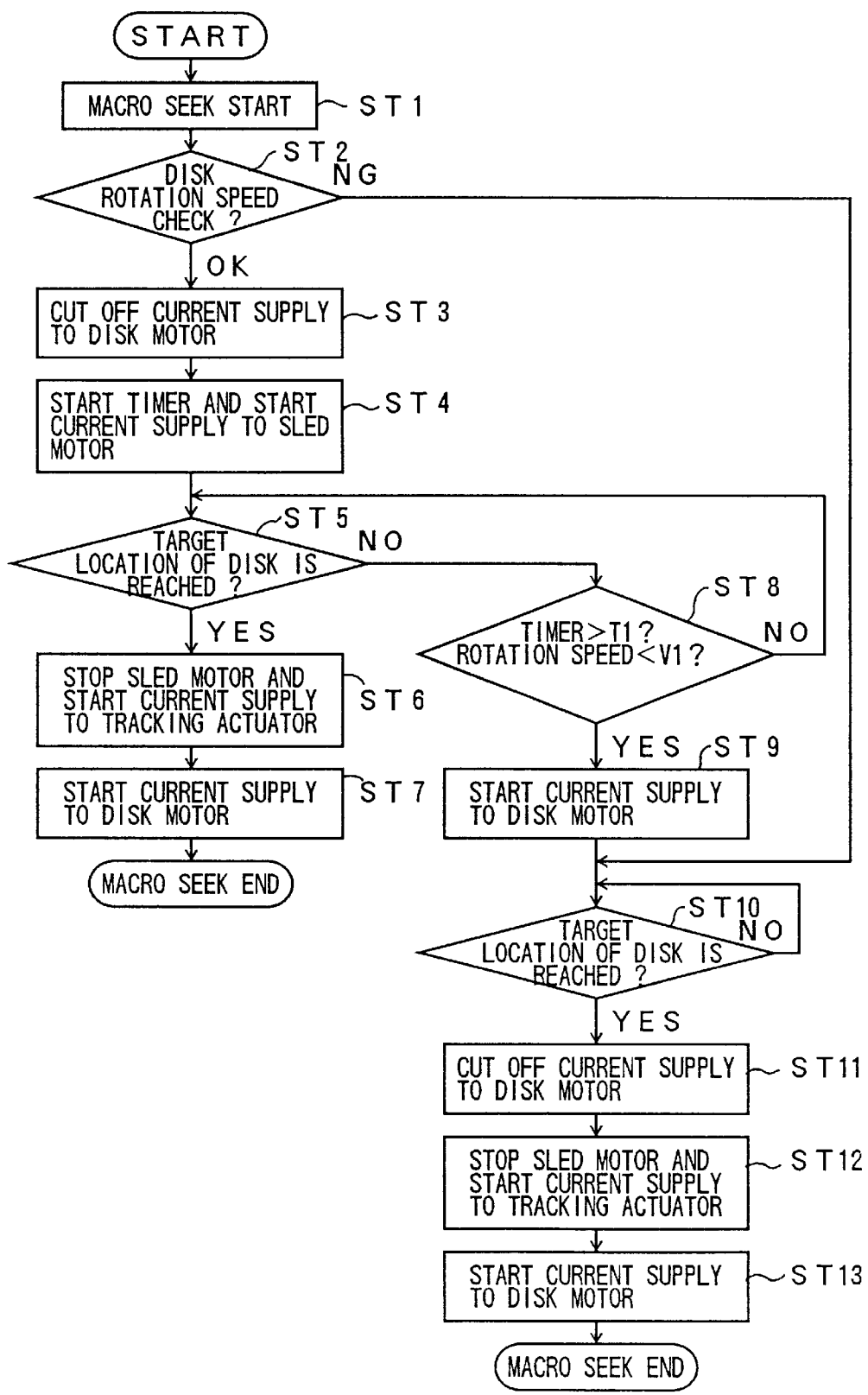
FIG. 2 is a flowchart for explaining a macro seek control procedure executed by a control unit of the disk apparatus when a macro seek is performed.

FIG. 2 shows a macro seek control procedure executed by the control unit 101 of the disk apparatus 100 when a macro seek is performed.

When a seek command is issued, the control unit 101 calculates a shifting distance of the optical head 8 based on the seek command. The control unit 101 selects one of the three seek patterns based on the shifting distance, and performs a corresponding seek in accordance with the selected seek pattern.

When a calculated shifting distance is above a given reference distance (which is equal to, for example, 100 tracks), the control unit 101 selects the macro seek control pattern. As shown in FIG. 2, the control unit 101 at step "ST1" starts performing the macro seek control procedure.

The control unit 101 at step "ST2" determines whether a rotation speed of the disk 2 indicated by the output signal of the frequency generator 5 is in a steady state.

When the result at the step ST2 is affirmative ("OK", or the disk rotation speed is in a steady state), the control unit 101 at step "ST3" cuts off the current supplied to the disk motor 3.

After the step ST3 is performed, the control unit 101 at step "ST4" starts the motor off timer 101a. Further, in the step ST4, the control unit 101 starts supplying the current to the sled motor 6, and cuts off the current supplied to the tracking actuator 8d. The shifting of the optical head 8 by the sled motor 6 is started, and the tracking servo control by the tracking actuator 8d is turned OFF.

When the shifting speed of the optical head 8 increases as the result of the step ST4, the control unit at step "ST5" determines whether the optical head 8 has reached a target location of the disk 2 by the shifting.

When the result at the step ST5 is not complete ("NO", or the optical head 8 has not yet reached the target location of the disk 2), the control unit 101 at step "ST8" determines whether the motor off timer 101a is above a given time limit "T1" and determines whether the rotation speed of the disk motor 3 is below a given speed "V1".

When the result at the step ST5 is complete ("YES", or the optical head 8 has reached the target location of the disk 2), the control unit 101 at step "ST6" exerts a braking force on the sled motor 6 to stop the shifting of the optical head 8, and starts supplying the current to the tracking actuator 8d. In the step ST6, the shifting of the optical head 8 by the sled motor 6 is stopped and the tracking servo control by the tracking actuator 8d is started.

After the tracking servo control becomes stable as the result of the step ST6, the control unit 101 at step "ST7" starts supplying the current to the disk motor 3. As a result of the step ST7, a normal control of the disk motor 3 is performed, and the linear velocity of the rotating disk 2 by the disk motor 3 is maintained at a constant level. After the step ST7 is performed, the macro seek control procedure of FIG. 2 ends.

When the result at the step ST8 is negative ("NO", or the timer 101a is not above the time limit T1 or the rotation speed is not below the speed V1), the control unit 101 repeats the determination of the step ST5. On the other hand, when the result at the step ST8 is affirmative ("YES", or the timer 101a is above the time limit T1 or the rotation speed is below the speed V1), the control unit 101 at step "ST9" starts supplying the current to the disk motor 3.

When the rotation speed of the disk motor 3 increases as the result of the step ST9 is performed, the control unit 101 at step "ST10" determines whether the optical head 8 has reached a target location of the disk 2 by the rotation of the disk motor 3. When the result at the step ST10 is not complete ("NO", or the optical head 8 has not reached the target location of the disk 2), the control unit 101 repeats the step ST10.

When the result at the step ST10 is complete ("YES", or the optical head 8 has reached the target location of the disk 2), the control unit 101 at step "ST11" cuts off the current supplied to the disk motor 3. After the step ST11 is performed, the control unit 101 at step "ST12" exerts a braking force on the sled motor 6 to stop the shifting of the optical head 8, and starts supplying the current to the tracking actuator 8d. In the step ST12, the shifting of the optical head 8 by the sled motor 6 is stopped and the tracking servo control by the tracking actuator 8d is started.

After the tracking servo control becomes stable as the result of the step ST12, the control unit 101 at step "ST13" starts supplying the current to the disk motor 3. As a result of the step ST13, the normal control of the disk motor 3 is performed, and the linear velocity of the rotating disk 2 by the disk motor 3 is maintained at the constant level. After the step ST13 is performed, the macro seek control procedure of FIG. 2 ends.

When the result at the step ST2 is negative ("NG", or the disk rotation speed is not in a steady state), the control unit 101 performs the step ST10 and the subsequent steps ST11–ST13, and the steps ST3 and ST4 are not performed by the control unit 101.

Figure 3:
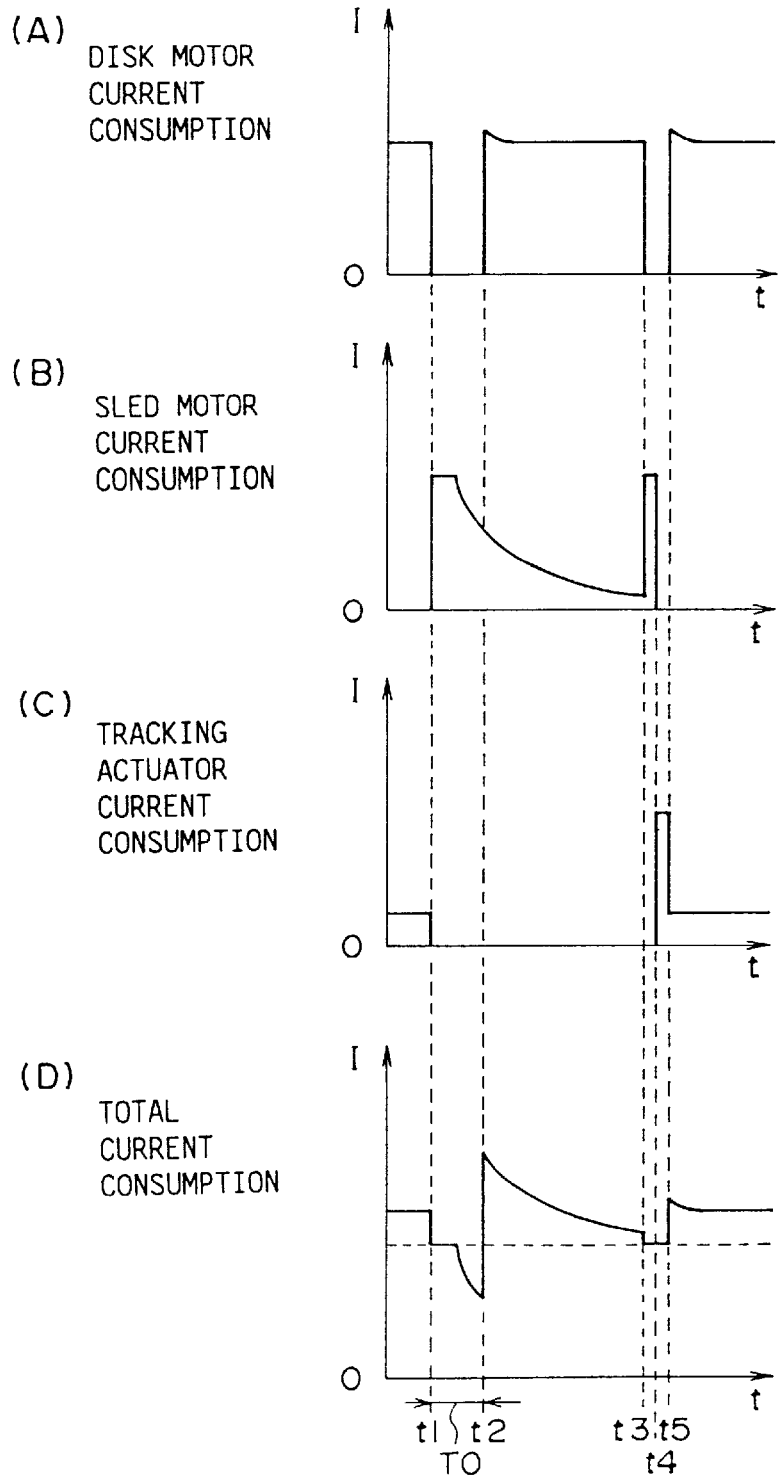
FIG. 3 is a time chart for explaining changes of current consumed by the elements of the disk apparatus when the macro seek is performed.

FIG. 3 is a time chart for explaining changes of current "I" consumed by the elements of the disk apparatus 100 when the macro seek is performed in accordance with the macro seek control procedure of FIG. 2.

In FIG. 3, (A) indicates a current consumption of the disk motor 3 during the macro seek, (B) indicates a current consumption of the sled motor 6 during the macro seek, (C) indicates a current consumption of the tracking actuator 8d during the macro seek, and (D) indicates a total current consumption of the elements 3, 6 and 8d of the disk apparatus 100 during the macro seek. As indicated by (D) in FIG. 3, the total current consumption of the elements 3, 6 and 8d of the disk apparatus 100 during the macro seek is produced by a sum of the respective current consumptions (indicated by (A), (B) and (C) in FIG. 3) of the disk motor 3, the sled motor 6 and the tracking actuator 8d.

As shown in FIG. 3, the control unit 101 at a time "t1" selects the macro seek pattern based on the calculated shifting distance, and starts performing the macro seek in accordance with the macro seek control procedure of FIG. 2. The current "I" supplied to the disk motor 3 is cut off at the time t1 by the control unit 101 (the step ST3 of FIG. 2) as indicated by (A) in FIG. 3. The current "I" supplied to the tracking actuator 8d is cut off at the time "t1" by the control unit 101 as indicated by (C) in FIG. 3. The current consumption of the sled motor 6 shows its peak at the time "t1" as indicated by (B) in FIG. 3.

The current consumption of the sled motor 6 is gradually reduced until a time "t3" elapses, and the shifting speed of the optical head 8 by the sled motor 6 is decreased. When a given period "To" elapses from the time "t1", the control unit 101 at a time "t2" starts supplying the current "I" to the disk motor 3. As a result of the current supply to the disk motor 3, a normal control of the disk motor 3 is performed after the time "t2", and the linear velocity of the rotating disk 2 by the disk motor 3 is maintained at a constant level.

Unlike the disk apparatus 1 of FIG. 9, in the disk apparatus 100 of the present embodiment, during the period "To" between the time "t1" and the time "t2", a certain amount of current is not supplied to the disk motor 3, and the total current consumption of the disk apparatus 100 during the macro seek is reduced by a corresponding amount, as indicated by (D) in FIG. 3.

At the time "t3", the optical head 8 is shifted to a position near the target location of the disk 2, and a braking force is exerted on the sled motor 6 to stop the shifting of the optical head 8. The current consumption of the sled motor 6 shows its peak again at the time "t3" as indicated by (B) in FIG. 3.

The current "I" supplied to the sled motor 6 is cut off at a time "t4". As indicated by (C) in FIG. 3, the current "I" supplied to the tracking actuator 8d is turned ON at the time "t4", and the tracking servo control is started by the control unit 101. The current consumption of the tracking actuator 8d shows its peak at the time "t4". At a time "t5", the tracking servo control becomes stable, and the current consumption of the tracking actuator 8d is reduced as indicated by (C) in FIG. 3.

In the present embodiment, as indicated by (A) in FIG. 3, during a period between the time "t3" and the time "t5", the current "I" supplied to the disk motor 3 is cut off by the control unit 101 (the step ST11 of FIG. 2). As described above, during this period, the braking force is exerted on the sled motor 6 at the time "t3" as indicated by (B) in FIG. 3, and the tracking servo control by the tracking actuator 8d becomes stable at the time t5 as indicated by (C) in FIG. 3. Hence, the total current consumption of the disk apparatus 100 during the macro seek is reduced by a corresponding amount, as indicated by (D) in FIG. 3.

Figure 4:
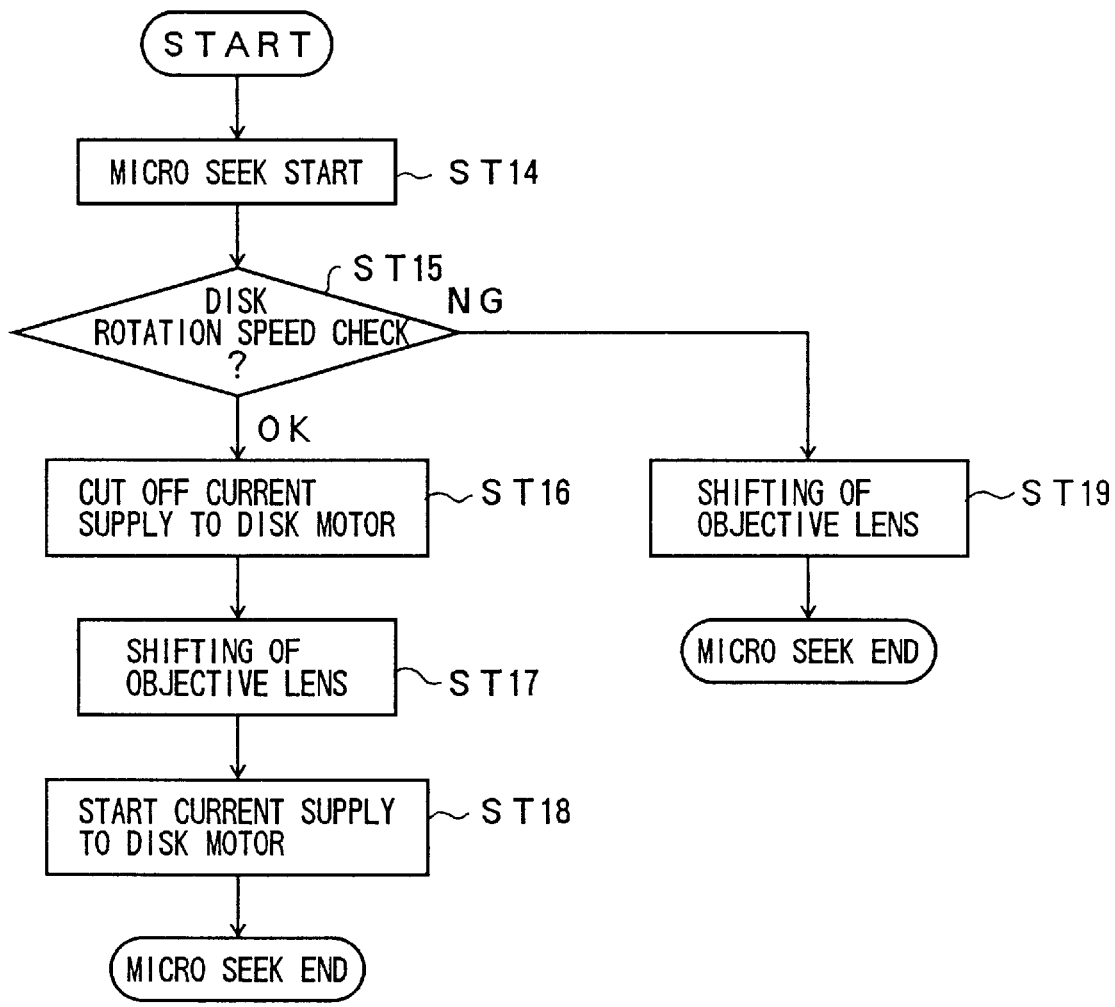
FIG. 4 is a flowchart for explaining a micro seek control procedure executed by the control unit of the disk apparatus when a micro seek is performed.

FIG. 4 shows a micro seek control procedure executed by the control unit 101 of the disk apparatus 100 when a micro seek is performed.

When a calculated shifting distance is below an effective shifting distance (for example, 100 tracks) of the objective lens 8c by the tracking actuator 8d, the control unit 100 selects the micro seek control pattern based on the calculated shifting distance. As shown in FIG. 4, the control unit at step "ST14" starts performing the micro seek in accordance with the micro seek control procedure. The current supplied to the sled motor 6 is cut off during the micro seek.

The control unit 101 at step "ST15" determines whether a rotation speed of the disk 2 indicated by the output signal of the frequency generator 5 is in a steady state.

When the result at the step ST15 is affirmative ("OK", or the disk rotation speed is in a steady state), the control unit 101 at step "ST16" cuts off the current supplied to the disk motor 3.

After the step ST16 is performed, the control unit 101 at step "ST17" performs the shifting of the objective lens 8c in a radial direction of the disk 2 by using the tracking actuator 8d. When it is detected that the objective lens 8c has reached a target location of the disk 2 by the shifting, the control unit 100 exerts a braking force on the tracking actuator 8d to stop the shifting of the objective lens 8c.

When the tracking servo control by the tracking actuator 8d becomes stable, the control unit 101 at step "ST18" starts supplying the current to the disk motor 3. After the step ST18 is performed, the micro seek control procedure of FIG. 4 ends. The control unit 101 starts reading data from or writing data to the disk 2 by using the optical head 8.

When the result at the step ST15 is negative ("NG", or the disk rotation speed is not in a steady state), the control unit 101 at step "ST19" performs the shifting of the objective lens 8c in a radial direction of the disk 2 by using the tracking actuator 8d. In this case, the control unit 101 does not performs the step ST16 in which the current supplied to the disk motor 3 is cut off. After the step ST19 is performed, the micro seek control procedure of FIG. 4 ends.

Figure 5:
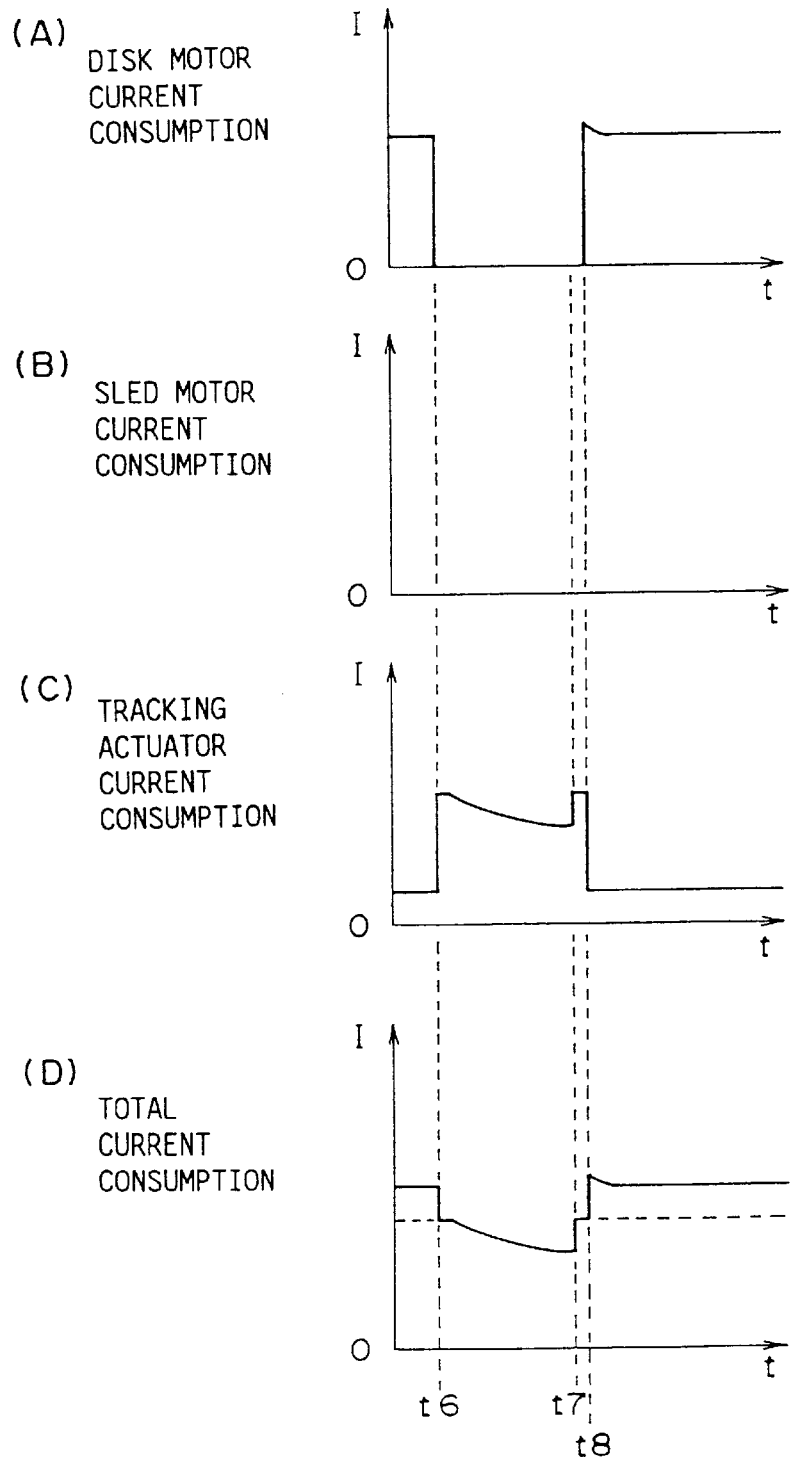
FIG. 5 is a time chart for explaining changes of current consumed by the elements of the disk apparatus when the micro seek is performed.

FIG. 5 is a time chart for explaining changes of current "I" consumed by the elements of the disk apparatus 100 when the micro seek is performed in accordance with the micro seek control procedure of FIG. 4.

In FIG. 5, (A) indicates a current consumption of the disk motor 3 during the micro seek, (B) indicates a current consumption of the sled motor 6 during the micro seek, (C) indicates a current consumption of the tracking actuator 8d during the micro seek, and (D) indicates a total current consumption of the elements 3, 6 and 8d of the disk apparatus 100 during the micro seek. As indicated by (D) in FIG. 5, the total current consumption of the elements 3, 6 and 8d of the disk apparatus 100 during the micro seek is produced by a sum of the respective current consumptions (indicated by (A), (B) and (C) in FIG. 5) of the disk motor 3, the sled motor 6 and the tracking actuator 8d.

As shown in FIG. 5, during the micro seek, the current "I" supplied to the sled motor 6 is always cut off as indicated by (B) in FIG. 5. At a time "t6", a micro seek command is issued. A drive current "I" is supplied to the tracking actuator 8d at the time "t6" as indicated by (C) in FIG. 5. The current consumption of the tracking actuator 8d shows its peak at the time "t6". After the drive current "I" supplied to the tracking actuator 8d is turned ON, the shifting of the objective lens 8c in a radial direction of the disk 2 by the tracking actuator 8d is started.

The current consumption of the tracking actuator 8d is gradually reduced until a time "t7" elapses, and the shifting speed of the objective lens 8c by the tracking actuator 8d is decreased. The objective lens 8c is shifted to a position near the target location of the disk 2. When it is detected that the actual shifting amount of the objective lens 8c matches with the calculated shifting distance, a braking force is exerted at the time "t7" on the tracking actuator 8d to stop the shifting of the objective lens 8c. The current consumption of the tracking actuator 8d shows its peak again at the time "t7" as indicated by (C) in FIG. 5. The tracking servo control becomes stable after the braking force is exerted, and the current consumption of the tracking actuator 8d is reduced at a time "t8" as indicated by (C) in FIG. 5. Thereafter, the reading of data from the disk 2 or the writing of data to the disk 2 is started by the optical head 8.

Unlike the disk apparatus 1 of FIG. 9, in the disk apparatus 100 of the present embodiment, during a period between the time "t6" and the time "t8", the current "I" supplied to the disk motor 3 is cut off by the control unit 101 (the step ST16 of FIG. 4). A certain amount of current is not supplied to the disk motor 3 during this period, and the total current consumption of the disk apparatus 100 during the micro seek is reduced by a corresponding amount, as indicated by (D) in FIG. 5.

A control pattern of the control unit 101 during the one-track seek is in conformity with the micro seek control pattern of the control unit 101 during the above-described micro seek. A shifting distance of the optical head 8 during the one-track seek is equivalent to one track of the disk 2, and it is extremely short. The control of the control unit 101 during the one-track seek is equivalent to the supplying of a one-shot pulse of the drive current to the tracking actuator 8d. In other words, during the one-track seek, the control unit 101 supplies a drive current to the tracking actuator 8d in a manner similar to the current "I" supplied to the tracking actuator 8d between the time "t7" and the time "t8", indicated by (C) in FIG. 5, during the micro seek. Further, during the one-track seek, the current "I" supplied to the disk motor 3 is cut off by the control unit 101.

Practically, the seek control procedures are sequentially performed by the disk apparatus 100 of FIG. 1 such that the optical head 8 is roughly shifted to a position near a target location of the disk 2 by the sled motor 6 during the macro seek, and the position of the objective lens 8c is finely adjusted by the tracking actuator 8d during the micro seek, and the objective lens 8c is finally locked to the target location of the disk 2 by the tracking actuator 8d during the one-track seek.

Figure 6:
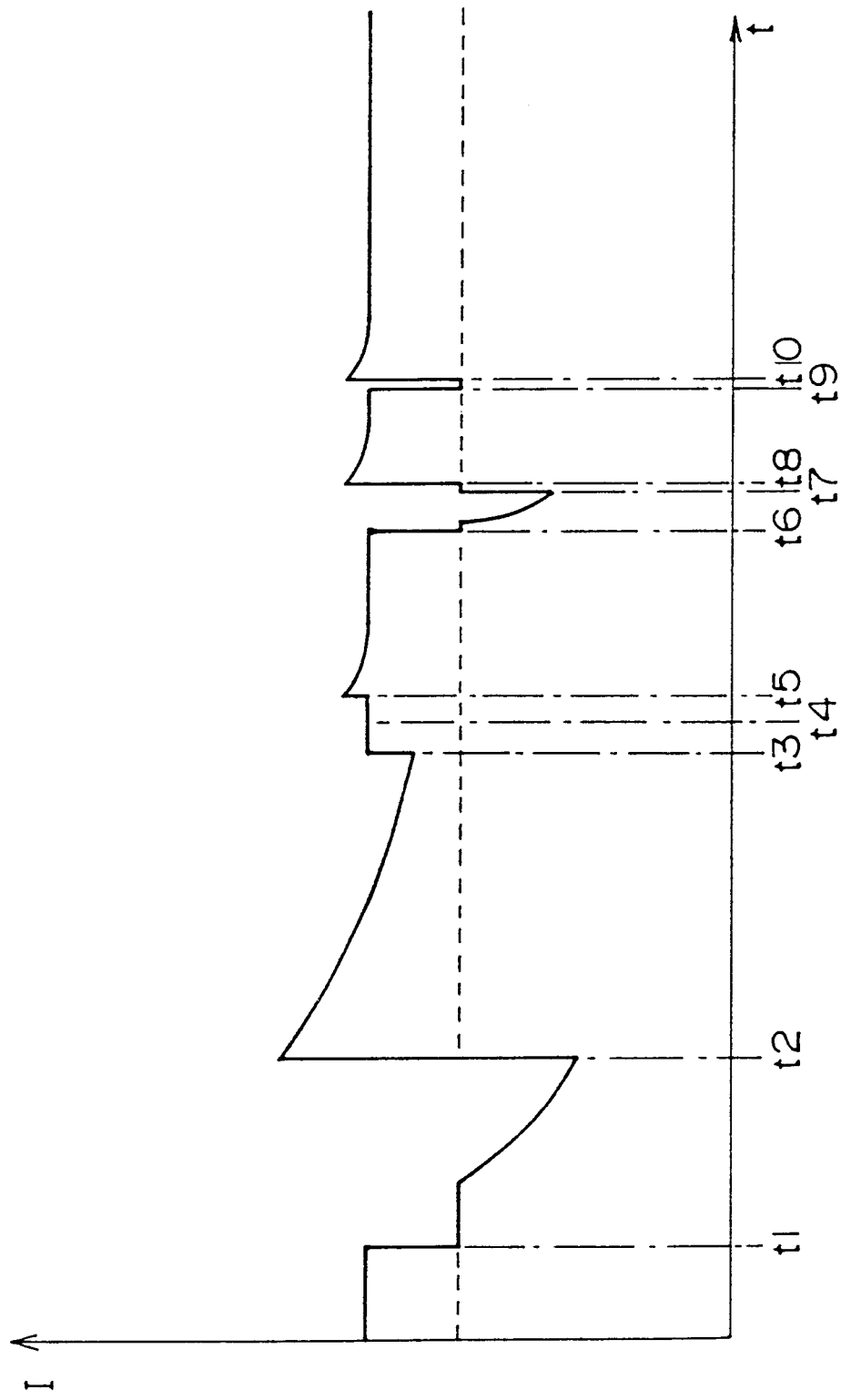
FIG. 6 is a time chart for explaining changes of current consumed by the disk apparatus when the macro seek, the micro seek and a one-track seek are successively performed.

FIG. 6 is a time chart for explaining changes of current consumed by the disk apparatus 100 when the macro seek, the micro seek and the one-track seek are successively performed. In FIG. 6, the macro seek is performed for a duration between the time "t1" and the time "t5", the micro seek is performed for a duration between the time "t6" and the time "t8", and the one-track seek is performed for a duration between a time "t9" and a time "t10".

As shown in FIG. 6, when performing the seek control procedures, the control unit 101 cuts off the current "I" supplied to the disk motor 3 at the time of occurrence of the peak in the current consumption of the sled motor 6 during the macro seek, and at the time of occurrence of the peak in the current consumption of the tracking actuator 8d during the micro seek. In the present embodiment, the total current consumption of the disk apparatus 100 indicates the sharply rising edges at the times "t2", "t5", "t8" and "t10" respectively. In order to recover the decreased rotation speed of the disk 2 at the time the current supplied to the disk motor 3 is cut off, the drive current supplied to the disk motor 3 is rapidly increased at the times "t2", "t5", "t8" and "t10" such that the rotation speed of the disk 2 is quickly raised.

In the disk apparatus 100 of the above-described embodiment, only at the time of occurrence of the peak in the current consumption of the sled motor 6 during the macro seek (for example, the period between the time "t1" and the time "t2" and the period between the time "t3" and the time "t5"), and at the time of occurrence of the peak in the current consumption of the tracking actuator 8d during the micro seek (for example, the period between the time "t6" and the time "t8"), the current "I" supplied to the disk motor 3 is cut off by the control unit 101, and a certain amount of current is not supplied to the disk motor 3 unlike the disk apparatus 1 of FIG. 9.

It is possible to reduce the total current consumption of the disk apparatus 100 during the seek by a corresponding amount. It is possible to effectively reduce the fluctuation of the total current consumption of the disk apparatus at the peak of the current consumption of the sled motor 6 or the tracking actuator 8d as in the disk apparatus 1 of FIG. 9. Hence, it is possible for the disk apparatus 100 of the present embodiment to effectively reduce the total current consumption of the disk apparatus 100 during the seek while providing a stable read/write operation of the optical head 8.

If the disk apparatus 100 is a battery-operated type, it is possible to prolong an operating life of the disk apparatus 100 by saving the capacity of the battery because the total current consumption of the disk apparatus 100 during the seek is reduced.

In the above-described embodiment, the current supplied to the disk motor 3 is completely cut off for a given period. Alternatively, the current supply control may be performed such that the current supplied to the disk motor 3 is cut off for a given first period and, after the end of the first period, the current supplied to the disk motor 3 is partially allowed for a given second period.

Figure 7:
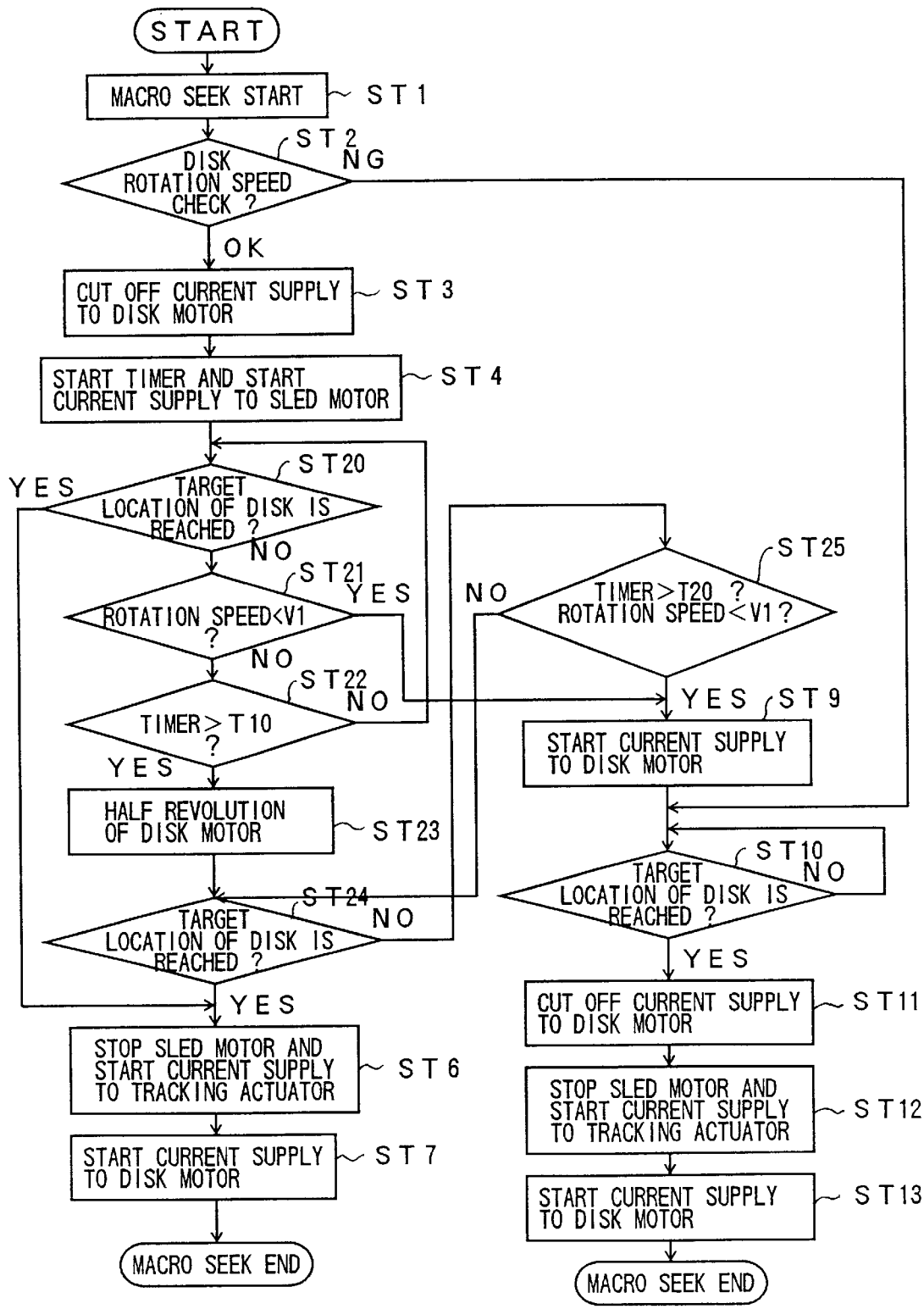
FIG. 7 is a flowchart for explaining another macro seek control procedure executed by the control unit of the disk apparatus when the macro seek is performed.

FIG. 7 shows another macro seek control procedure executed by the control unit 101 of the disk apparatus 100 when the macro seek is performed. In FIG. 7, the steps which are the same as corresponding steps in FIG. 2 are designated by the same reference numerals, and a description thereof will be omitted.

As shown in FIG. 7, the control unit 101 in the present embodiment at step "ST4" starts the motor off timer 101a. Further, in the step ST4, the control unit 101 starts supplying the current to the sled motor 6, and cuts off the current supplied to the tracking actuator 8d. The shifting of the optical head 8 by the sled motor 6 is started, and the tracking servo control by the tracking actuator 8d is turned OFF.

When the shifting speed of the optical head 8 increases as the result of the step ST4, the control unit 101 at step "ST20" determines whether the optical head 8 has reached a target location of the disk 2 by the shifting.

When the result at the step ST20 is complete ("YES", or the optical head 8 has reached the target location of the disk 2), the control unit 101 at step "ST6" exerts a braking force on the sled motor 6 to stop the shifting of the optical head 8, and starts supplying the current to the tracking actuator 8d. In the step ST6, the shifting of the optical head 8 by the sled motor 6 is stopped and the tracking servo control by the tracking actuator 8d is started.

After the tracking servo control becomes stable as the result of the step ST6, the control unit 101 at step "ST7" starts supplying the current to the disk motor 3. As a result of the step ST7, the normal control of the disk motor 3 is performed, and the linear velocity of the rotating disk 2 by the disk motor 3 is maintained at a constant level. After the step ST7 is performed, the macro seek control procedure of FIG. 7 ends.

When the result at the step ST20 is not complete ("NO", or the optical head 8 has not yet reached the target location of the disk 2), the control unit 101 at step "ST21" determines whether the rotation speed of the disk motor 3 is below a given speed "V1". Further, the control unit 101 at step "ST22" determines whether the motor off timer 101a is above a first time limit "T10".

When the result at the step ST21 is negative (the rotation speed>V1) and the result at the step ST22 is affirmative (the timer>T10), the control unit 101 at step "ST23" supplies a given amount of current to the disk motor 3 so that the disk 2 is rotated by the disk motor 3 a half revolution. After the step ST23 is performed, the control unit 101 at step "ST24" determines whether the optical head 8 has reached the target location of the disk 2 by the rotation.

When the result at the step ST24 is complete ("YES", or the optical head 8 has reached the target location of the disk 2), the control unit 101 performs the step ST6 wherein the braking force is exerted on the sled motor 6 to stop the shifting of the optical head 8, and the current supplied to the tracking actuator 8d is allowed. After the step ST6 is performed, the control unit 101 performs the step ST7 wherein the current supplied to the disk motor 3 is allowed. After the step ST7 is performed, the macro seek control procedure of FIG. 7 ends.

When the result at the step ST24 is not complete ("NO", or the optical head 8 has not yet reached the target location of the disk 2), the control unit 101 at step "ST25" determines whether the rotation speed of the disk motor 3 is below the given speed "V1" and determines whether the motor off timer 101a is above a second time limit "T20".

When the result at the step ST25 is negative ("NO", or the timer 101a is not above the second time limit T20 or the rotation speed is not below the speed V1), the control unit 101 repeats the determination of the step ST24. On the other hand, when the result at the step ST25 is affirmative ("YES", or the timer 101a is above the second time limit T20 and the rotation speed is below the speed V1), the control unit 101 at step "ST9" starts supplying the current to the disk motor 3.

When the rotation speed of the disk motor 3 increases as the result of the step ST9 is performed, the control unit 101 at step "ST10" determines whether the optical head 8 has reached the target location of the disk 2 by the rotation of the disk motor 3. When the result at the step ST10 is not complete ("NO", or the optical head 8 has not reached the target location of the disk 2), the control unit 101 repeats the step ST10.

When the result at the step ST10 is complete ("YES", or the optical head 8 has reached the target location of the disk 2), the control unit 101 at step "ST11" cuts off the current supplied to the disk motor 3. After the step ST11 is performed, the control unit 101 at step "ST12" exerts a braking force on the sled motor 6 to stop the shifting of the optical head 8, and starts supplying the current to the tracking actuator 8d. In the step ST12, the shifting of the optical head 8 by the sled motor 6 is stopped and the tracking servo control by the tracking actuator 8d is started.

After the tracking servo control becomes stable as the result of the step ST12, the control unit 101 at step "ST13" starts supplying the current to the disk motor 3. As a result of the step ST13, the normal control of the disk motor 3 is performed, and the linear velocity of the rotating disk 2 by the disk motor 3 is maintained at the constant level. After the step ST13 is performed, the macro seek control procedure of FIG. 7 ends.

When the result at the step ST2 is negative ("NG", or the rotation speed is not in a steady state), the control unit 101 performs the step ST10 and the subsequent steps ST11–ST13, and the steps ST3 and ST4 are not performed by the control unit 101.

When the result at the step ST21 is affirmative (the rotation speed<the speed V1), the control unit 101 performs the step ST9 wherein the current supplied to the disk motor 3 is allowed. In the step ST9, the control unit 101 performs the normal control of the disk motor 3. When the rotation speed of the disk motor 3 increases as the result of the step ST9 is performed, the control unit 101 performs the determination of the step ST10. The control unit 101 makes the determination as to whether the optical head 8 has reached the target location of the disk 2 by the rotation of the disk motor 3.

When the result at the step ST21 is negative (the rotation speed>V1) and the result at the step ST22 is negative (the timer<T10), the control unit 101 repeats the determination of the step "ST20". The control unit 101 makes again the determination as to whether the optical head 8 has reached the target location of the disk 2.

Figure 8:
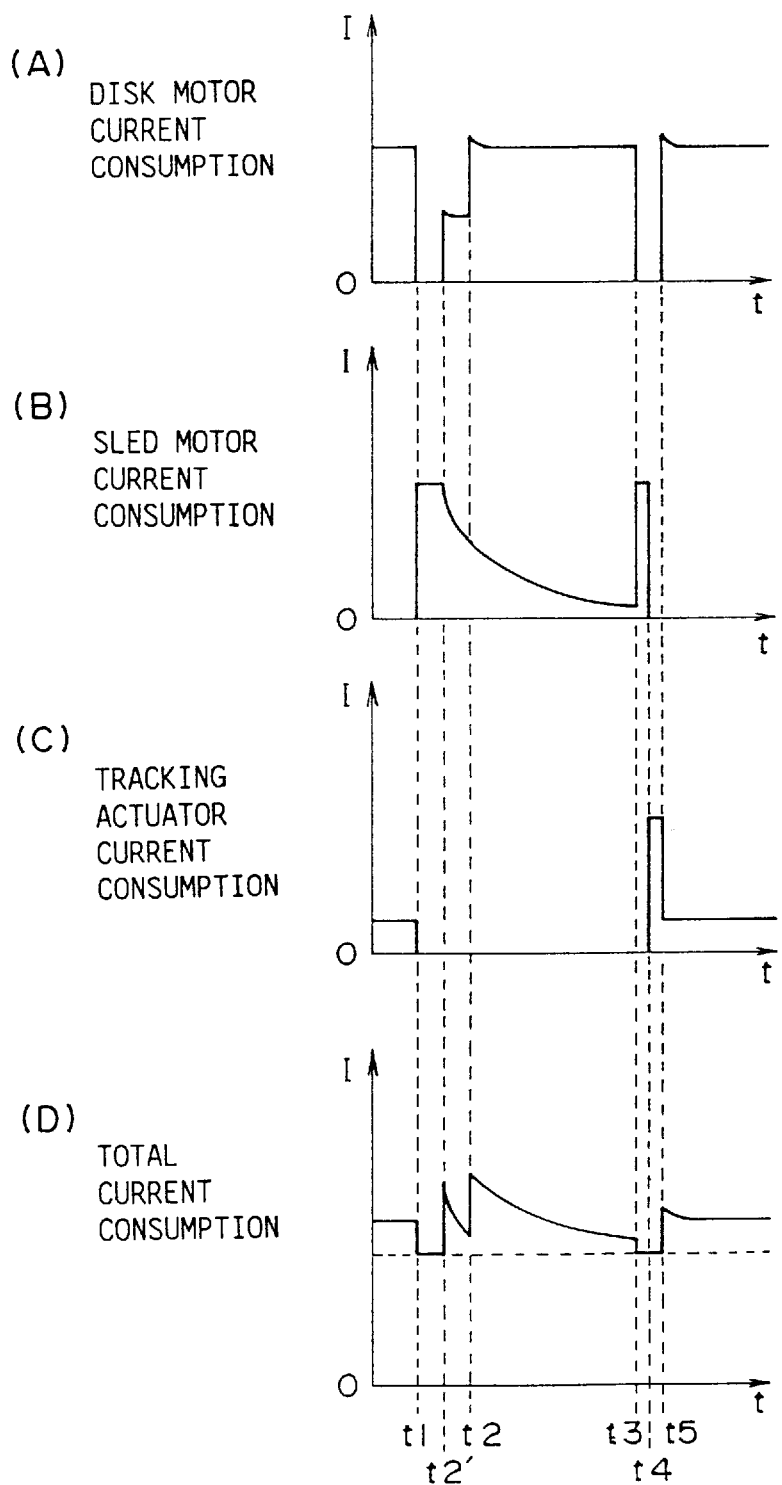
FIG. 8 is a time chart for explaining changes of current consumed by the elements of the disk apparatus when the macro seek is performed.

FIG. 8 is a time chart for explaining changes of current "I" consumed by the elements of the disk apparatus 100 when the macro seek is performed in accordance with the macro seek control procedure of FIG. 7.

In FIG. 8, (A) indicates a current consumption of the disk motor 3 during the macro seek, (B) indicates a current consumption of the sled motor 6 during the macro seek, (C) indicates a current consumption of the tracking actuator 8d during the macro seek, and (D) indicates a total current consumption of the elements 3, 6 and 8d of the disk apparatus 100 during the macro seek. As indicated by (D) in FIG. 8, the total current consumption of the elements 3, 6 and 8d of the disk apparatus 100 during the macro seek is produced by a sum of the respective current consumptions (indicated by (A), (B) and (C) in FIG. 8) of the disk motor 3, the sled motor 6 and the tracking actuator 8d.

As shown in FIG. 8, the control unit 101 at a time "t1" selects the macro seek pattern based on the calculated shifting distance, and starts performing the macro seek in accordance with the macro seek control procedure of FIG. 7. The current "I" supplied to the disk motor 3 is cut off at the time t1 by the control unit 101 (the step ST3 of FIG. 7) as indicated by (A) in FIG. 8. The current consumption of the sled motor 6 shows its peak at the time "t1" as indicated by (B) in FIG. 8.

The current consumption of the sled motor 6 is gradually reduced until a time "t3" elapses, and the shifting speed of the optical head 8 by the sled motor 6 is decreased. A given time "t2'" elapses at the start of the decrease of the current consumption of the sled motor 6. The time t2' corresponds to the first time limit T10 of the timer 101a. The control unit 101 at the time t2' supplies a given amount of current to the disk motor 3 so that the disk 2 is rotated by the disk motor 3 a half revolution (the step ST23 of FIG. 7). In the total current consumption of FIG. 3 in the previous embodiment, the current consumed by the disk motor 3 is rapidly increased at the time t2. However, in the present embodiment, when the time t2' elapses, the given amount of current is supplied to the disk motor 3 before the rapid increase of the current consumption of the disk motor 3 at the time t2. As indicated by (D) in FIG. 8, the rapid increase of the total current consumption of the disk apparatus 100 at the time t2 can be prevented in the present embodiment.

It is possible for the disk apparatus of the present embodiment to more effectively reduce the fluctuation of the total current consumption of the disk apparatus at the peak of the current consumption of the sled motor 6 or the tracking actuator 8d. It is possible for the disk apparatus 100 of the present embodiment to effectively reduce the total current consumption of the disk apparatus 100 during the seek while providing a stable read/write operation of the optical head 8. If the disk apparatus 100 is a battery-operated type, it is possible to prolong an operating life of the disk apparatus 100 by saving the capacity of the battery.

In the above-described embodiments, only at the time of occurrence of the peak in the current consumption of the sled motor 6 or the tracking actuator 8d during the seek, the current supplied to the disk motor 3 is cut off by the control unit 101, and a certain amount of current is not supplied to the disk motor 3. It is possible to effectively reduce the total current consumption of the disk apparatus 100 during the seek. It is possible to effectively reduce the fluctuation of the total current consumption of the disk apparatus 100 at the peak of the current consumption of the sled motor 6 or the tracking actuator 8$d$. Hence, it is possible for the disk apparatus of the above-described embodiments to effectively reduce the total current consumption during the seek while providing a stable read/write operation of the optical head 8.

In addition, the disk apparatus according to the present invention is applicable to not only information reproducing systems, such as CD-ROM (compact disk read only memory) drives, but also information reproducing/recording systems, such as CD-R (compact disk recordable) drives.

Further, the present invention is not limited to the above-described embodiments, and variations and modifications may be made without departing from the scope of the present invention.

The present invention is based on Japanese priority application No.9-305949, filed on Nov. 7, 1997, the entire contents of which are hereby incorporated by reference.

What is claimed is:

1. A disk apparatus in which a control unit performs a seek control, comprising:

a disk motor for rotating a disk placed at a loaded position in the disk apparatus;

a motor driver for controlling the disk motor such that the disk is rotated by the disk motor at a controlled speed;

a read/write head for reading information from or writing information to the disk when the disk is rotated by the disk motor at the controlled speed;

a head shifting unit for shifting the head in a radial direction of the disk to a target location thereof when a seek is performed; and current supply control means for controlling current supplied to the disk motor during the seek, wherein the current supply control means cuts off the current supply to the disk motor for a predetermined first period after a start of the seek wherein the current supply control means cuts off the current supply to the disk motor for a predetermined second period after the head is shifted to a position near the target location of the disk during the seek.

2. The disk apparatus according to claim 1, wherein the head includes an optical pickup, an objective lens and a tracking actuator, the optical pickup optically reading information from the disk by receiving a reflection beam from the disk, the objective lens converting an emission laser beam into a converging laser beam onto the disk, the tracking actuator shifting the objective lens in a radial direction of the disk.

3. The disk apparatus according to claim 2, wherein the control unit sequentially performs a macro seek control wherein the optical pickup is shifted to a position near the target location of the disk by the head shifting unit, a micro seek control wherein the position of the objective lens is finely adjusted by the tracking actuator, and a one-track seek control wherein the objective lens is locked to the target location of the disk by the tracking actuator.

4. The disk apparatus according to claim 3, wherein the control unit selects one of the macro seek control, the micro shifting control and the one-track seek control based on a shifting distance calculated upon issuance of a seek command, the shifting distance indicating a distance from a current position of the head to the target location of the disk.

5. The disk apparatus according to claim 1, wherein the control unit includes a timer which starts counting from a time the current supply control means starts the cutting of the current supply to the disk motor for the predetermined first period, and the current supply control means restarts the current supply to the disk motor when the timer is above the predetermined first period.

6. The disk apparatus according to claim 1, wherein the control unit determines whether a rotation speed of the disk is below a predetermined speed during the cutting of the current supply to the disk motor, and, when the rotation speed of the disk is determined as being below the predetermined speed, the current supply control means restarts the current supply to the disk motor.

7. The disk apparatus according to claim 1, wherein the motor driver controls the disk motor such that either a linear velocity of the rotating disk or an angular velocity of the rotating disk is maintained at a constant level.

8. The disk apparatus according to claim 1, wherein the head includes a tracking actuator for shifting an objective lens in a radial direction of the disk, and the current supply control means cuts off the current supply to the disk motor for said predetermined second period after a time of occurrence of a peak in a current consumption of the tracking actuator during the seek.

9. The disk apparatus according to claim 1, wherein the current supply control means cuts off the current supply to the disk motor for the predetermined first period after a time of occurrence of a peak in a current consumption of the head shifting unit during the seek.

* * * * *